(12) United States Patent
Hattori

(10) Patent No.: US 7,190,160 B2
(45) Date of Patent: *Mar. 13, 2007

(54) ROTATION SENSOR

(75) Inventor: Tadashi Hattori, Hisai (JP)

(73) Assignee: Sumiden Electronics, Ltd., Hisai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/131,360

(22) Filed: May 18, 2005

(65) Prior Publication Data

US 2006/0017433 A1    Jan. 26, 2006

(30) Foreign Application Priority Data

Jul. 20, 2004    (JP)    ............... 2004-211572

(51) Int. Cl.
G01B 7/30    (2006.01)
(52) U.S. Cl. ................................. 324/207.25
(58) Field of Classification Search ............ 324/207.25
See application file for complete search history.

(56) References Cited

U.S. PATENT DOCUMENTS 6,064,200 A * 5/2000 Saito et al. ............ 327/207.25

2003/0193328 A1 * 10/2003 Iwashita .................. 324/207.2

FOREIGN PATENT DOCUMENTS

| JP | 2002-257840 A |   | 9/2002 |
| JP | 2002365305 A | * | 12/2002 |
| JP | 2003-307523 A |   | 10/2003 |

* cited by examiner

Primary Examiner—Bot LeDynh
(74) Attorney, Agent, or Firm—McDermott Will & Emery LLP

(57) ABSTRACT

A wheel speed sensor includes a rotation detector mounted in an opening formed in a holder which is in turn inserted in a casing having one end closed. A pair of lead pieces extend from the detector and have connecting portions connected to respective relay terminals. A lid having a projection is fitted in the opening of the holder so that the projection is inserted between the connecting portions. The projection thus separates and insulates the connecting portions from each other. A cover is formed by molding a resin to cover the open end of the casing and the portion of the holder protruding from the open end of the casing.

2 Claims, 5 Drawing Sheets

ROTATION SENSOR

BACKGROUND OF THE INVENTION

The present invention relates to a rotation sensor such as a vehicle wheel speed sensor or an engine revolution sensor.

FIG. 8 shows a conventional wheel speed sensor P. It includes a detector X mounted on a circuit board 3 which is in turn carried on a resin holder 2. With the detector X mounted on the holder 2, the holder 2 is inserted into a cylindrical casing 1 having open and closed ends from its open end 1a until a base portion 2a of the holder 2 closes the open end of the casing 1. A pair of lead wires 9 extending from the detector X are each connected to one of a pair of relay terminals 5 which extend through the base portion 2a of the holder 2 and protrudes from its outer end face. The relay terminals 5 have their protruding ends connected to an output cable 6. A cover 4 is formed by molding a resin to completely conceal the portion of the holder 2 protruding from the open end 1a of the casing 1 and to embed therein the protruding ends of the relay terminals 5 and the portion of the cable 6 connected to the terminals 5.

The detector X typically comprises an IC chip for detecting magnetic fields and electronic parts (circuit) for controlling (as disclosed in JP Patent publication 2002-257840, FIG. 4) or comprises an electromagnetic pickup including a pole piece provided inside of a bobbin on which a coil is wound, and a magnet provided rearwardly of the pole piece (as disclosed in the above publication, FIG. 1).

As shown in FIG. 8, the wheel speed sensor P is mounted on a mounting member A with its detector X opposing a rotary member B to be detected. The detector X picks up any change in the magnetic field produced from the rotary member B when the rotary member B rotates, and converts the change in the magnetic field to electrical signals which are transferred to a control device through the relay terminals 5 and the output cable 6. The rotary member B is a ferromagnetic pulse ring having teeth similar to gear teeth on the radially outer periphery thereof, or a magnet pulse ring having its radially outer periphery magnetized such that North poles and South poles circumferentially alternate with each other.

As today's motor vehicles are increasingly sophisticated, it is necessary to densely pack various devices and components, besides wheel speed sensors, in a limited space. Thus, smaller wheel speed sensors are required. To reduce the size of a wheel speed sensor, its components have to be arranged closer to one another. This increases the possibility of interference of each component with other components.

For example, the pair of lead wires 9 extending from the detector X tend to interfere with each other at their connecting portions 9a connected to the relay terminals 5. That is, if the holder 2 has a sufficiently large diameter as in the case of a conventional wheel speed sensor P shown in FIG. 9A, the connecting portions 9a can be sufficiently spaced from each other as shown by the letter L in FIG. 9A. But in a smaller wheel speed sensor P shown in FIG. 9B, it is necessary to correspondingly reduce the diameter of the holder 2 and the distance L between the connecting portions 9a.

The smaller the distance L between the connecting portions 9a, the greater the chance of poor insulation between the connecting portions 9a. For example, the connecting portions 9a may be electrically connected together through protrusions c of welded portions due to excessive welding as shown in FIG. 10A, or a protrusion d of a soldered portion as shown in FIG. 10B, or due to misalignment of the lead wires 9 and the relay terminals 5 as shown in FIG. 10C.

Poor insulation of the connecting portions 9a tends to make the wheel speed sensor P defective.

An object of the present invention is to provide a rotation sensor wherein the connecting portions of a pair of leads extending from a detector that are connected to relay terminals are reliably insulated from each other.

SUMMARY OF THE INVENTION

According to the present invention, there is provided a rotation sensor comprising a holder, a detector mounted to the holder for sensing any change in a magnetic field produced when a rotary member rotates and converting such change in the magnetic field to electrical signals, a pair of leads extending from the detector, a pair of relay terminals each having a connecting portion connected to one of the leads, an output line connected to the relay terminals, and an insulating member disposed between the connecting portions.

With this arrangement, since the connecting portions are reliably insulated from each other, the rotation sensor is less likely to become defective.

In one arrangement, the detector is mounted in an opening formed in the holder, the rotation sensor further comprises a lid fitted in the opening and formed with a projection as the insulating member.

With this arrangement, by fitting the lid in the opening of the holder, the projection as the insulating member is spontaneously inserted between the connecting portions, thereby reliably separating and insulating the connecting portions from each other. If the lid is not snugly fit in the opening of the holder, one can instantly see that the projections are not inserted between the connecting portions due to poor insulation therebetween as shown in FIGS. 10A–10C. Thus, such poor insulation between the connecting portions can be found easily and quickly.

In a preferable arrangement, the holder is formed of a resin and retains the relay terminals, the detector comprises a sensor element for sensing any change in a magnetic field, and the leads are lead pieces extending from the sensor element in parallel to each other. With this arrangement, the detector can be made small.

BRIEF DESCRIPTION OF THE DRAWINGS

Other features and objects of the present invention will become apparent from the following description made with reference to the accompanying drawings.

DETAILED DESCRIPTION OF THE PREFERRED EMBODIMENTS

Figure 8:
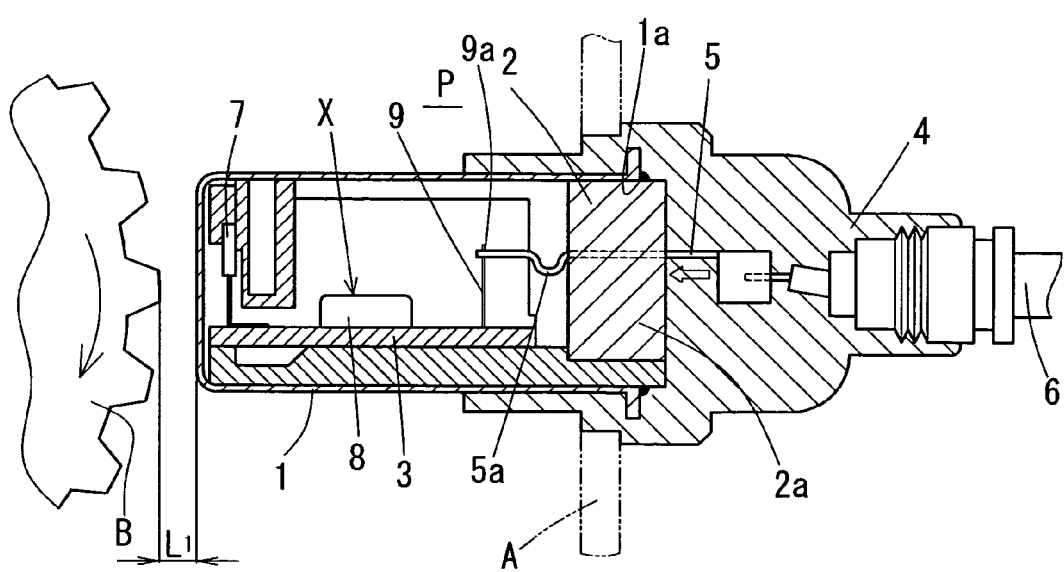
FIG. 8 is a sectional front view of a conventional rotation sensor.
Figure 9A:
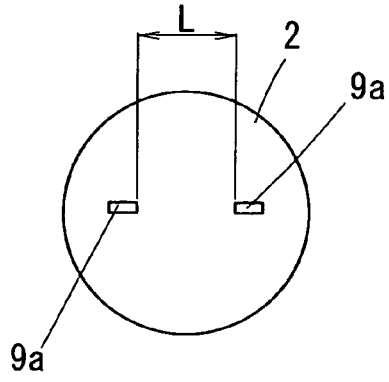
FIGS. 9A and 9B schematically show connecting portions of a pair of lead wires that are connected to respective relay terminals in a conventional rotation sensor.
Figure 9B:
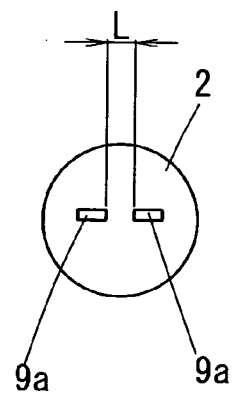

The rotation sensor shown in FIGS. 1–5 is a wheel speed sensor P. Elements identical to those shown in FIG. 8 are denoted by identical numerals. The sensor P includes a rotation detector X comprising a sensor element 11 such as a Hall IC for detecting any change in the magnetic field produced from the rotary member B to be detected (see FIG. 8), lead pieces 12 extending from the sensor element 11 parallel to each other, and a resin-coated electronic part 13 such as a capacitor extending between the lead pieces 12. The sensor P of the embodiment has no circuit board 3 as shown in FIG. 8. Thus, electronic parts other than the electronic part 3 are provided outside of a casing 1. If the electronic part 3 is a capacitor, it prevents electrostatic discharge.

Figure 7:
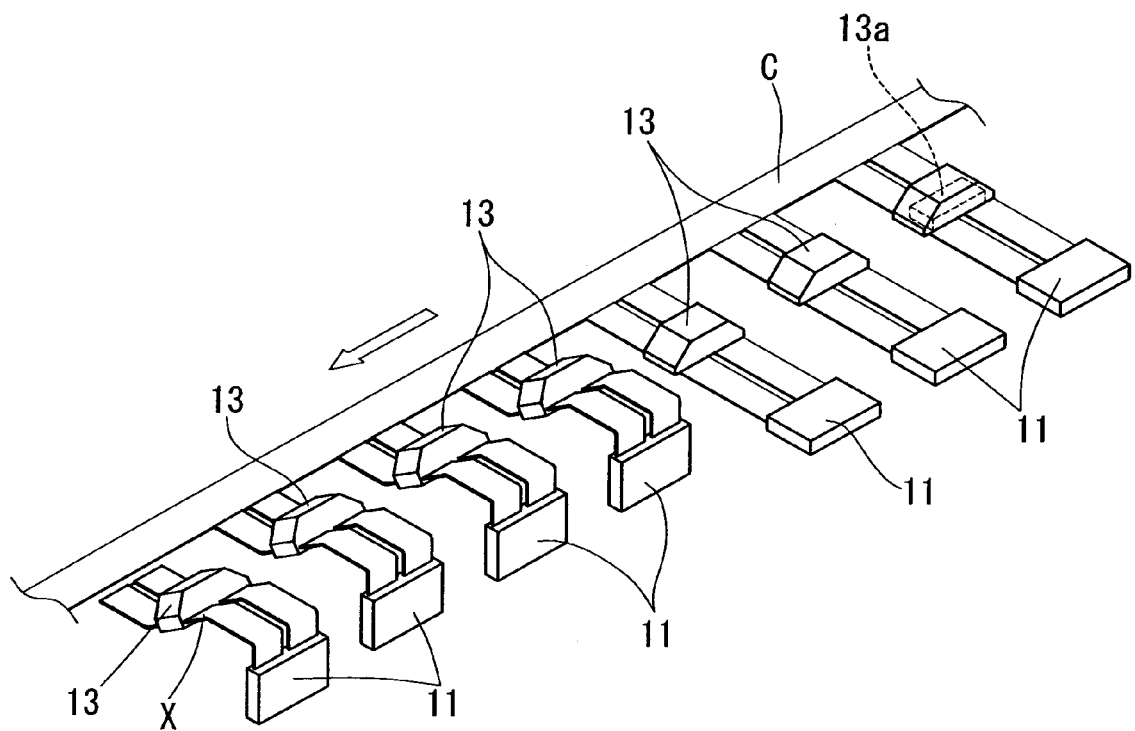
FIG. 7 shows how detectors for the rotation sensor according to the present invention are manufactured.

As shown in FIG. 7, a plurality of such detectors may be formed by bending respective pairs of lead pieces 12 each carrying a sensor element 11 and a resin-coated electronic part 13 and connected to a carrier C, and separating them from the carrier C, while moving the carrier C in the direction of the arrow. Alternatively, the respective pairs of lead pieces 12 may be bent after separating them from the carrier C.

Figure 1:
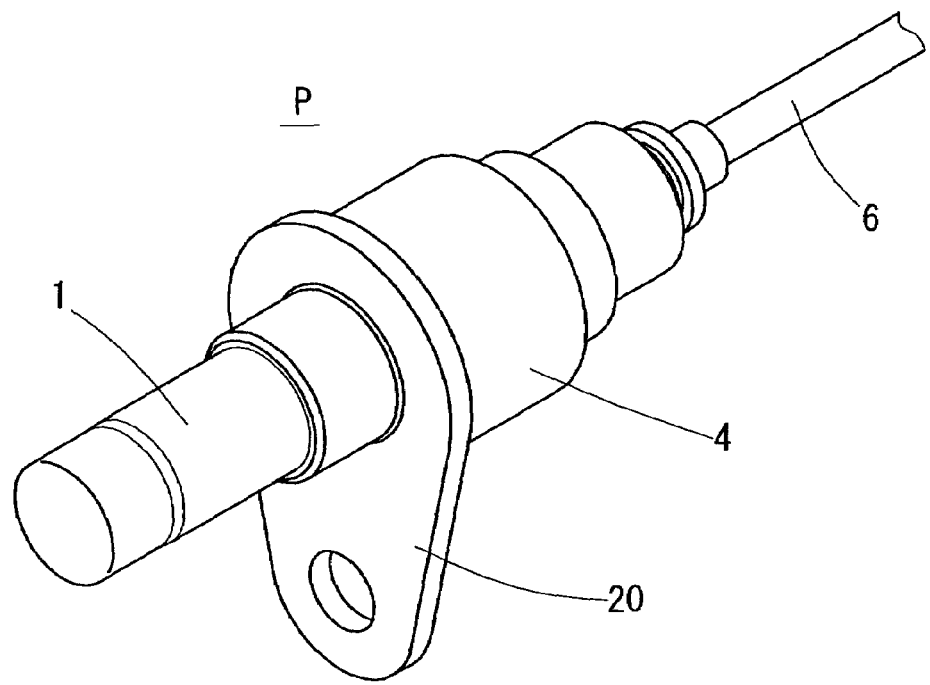
FIG. 1 is a perspective view of a rotation sensor embodying the present invention.
Figure 2:
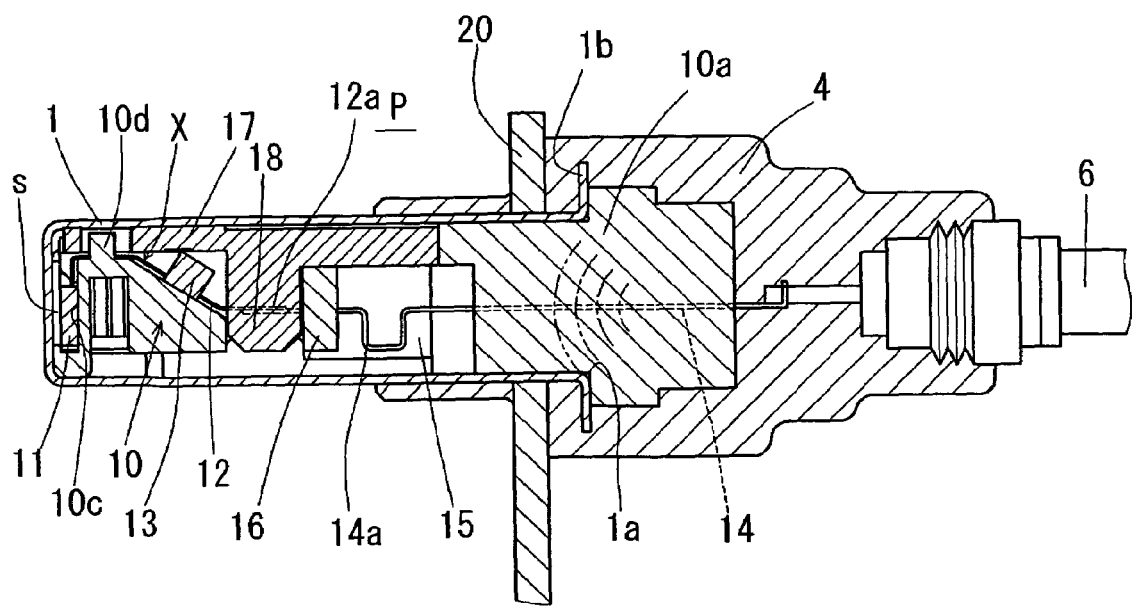
FIG. 2 is a front view in vertical section of the rotation sensor of FIG. 1.
Figure 3:
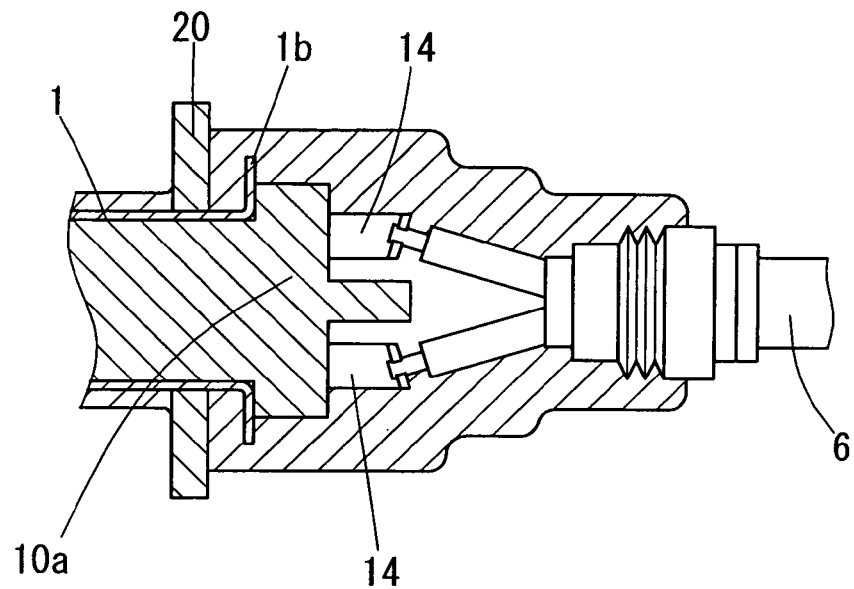
FIG. 3 is a partial sectional plan view of the rotation sensor of FIG. 1.
Figure 4:
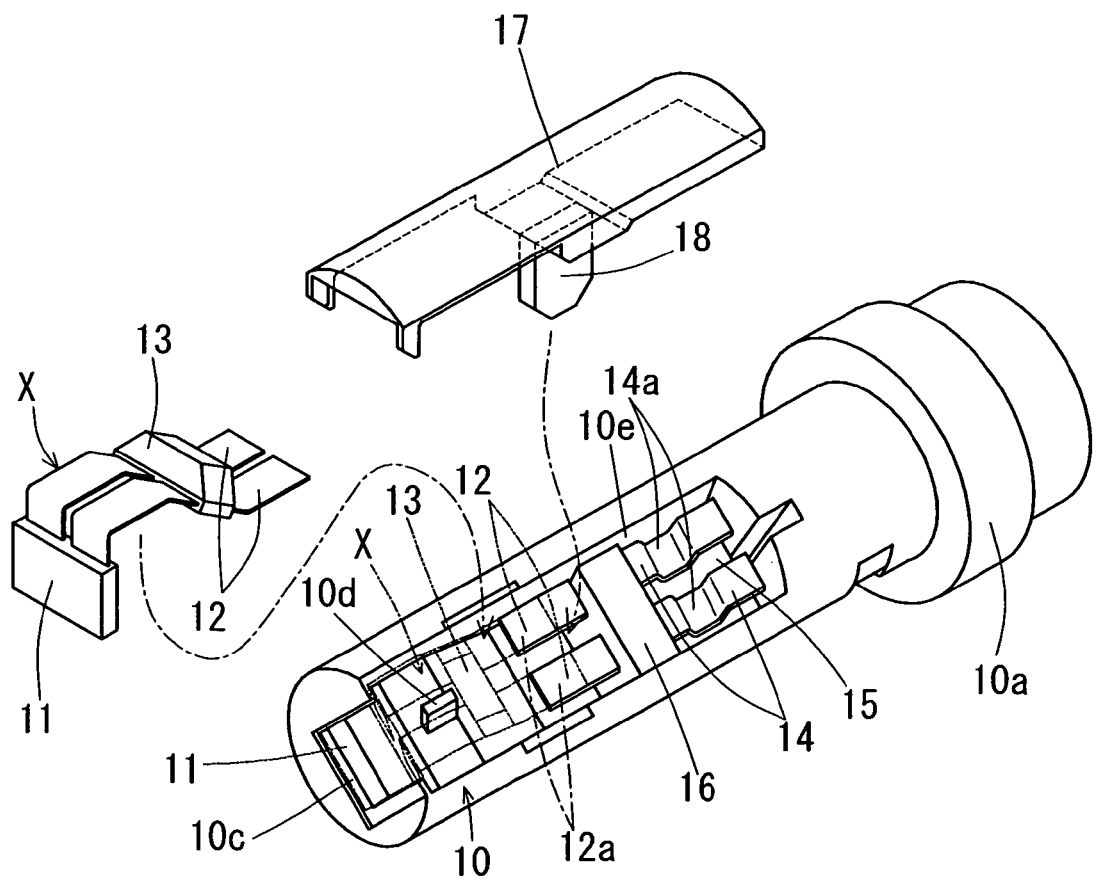
FIG. 4 is a partial exploded perspective view of the rotation sensor of FIG. 1.

The detector X is received in an opening 10e formed in a resin holder (bobbin) 10. A pair of relay terminals 14 which are inserted in the holder 10 are connected to the respective lead pieces 12 by spot welding such as resistance welding. In this state, the sensor element 11 is received in a hole 10c formed in the holder 10. The holder 10 has a projection 10d adapted to be inserted into a gap between the lead pieces 12 when the detector X is received in the holder 10, thereby positioning the detector X in the holder. Before a cover 4 is formed by molding, a gap (not shown) is preferably present between the forward end wall of the casing 1 and the forward end of the holder 10. With this arrangement, even when axial pressure is applied to the holder when forming the cover 4 by molding, the holder 10 will not be pressed against the forward end wall of the casing 1. This protects the sensor element 11 against damage. Alternatively, as shown in FIG. 2, a gap s may be present between the forward end wall of the casing 1 and the front end face of the sensor element 11 with the holder 10 in abutment with the forward end wall of the casing 1. This arrangement also protects the sensor element 11 when forming the cover 4. But either arrangement is not an essential requirement in this invention.

Now referring to FIG. 8, the distance L1 between the rotary member B to be detected and the forward end wall of the casing 1 is preferably sufficiently large in order to prevent them from colliding against each other. On the other hand, the distance between the rotary member B and the sensor element 7 (or sensor element 11 according to the present invention) has to be sufficiently short for higher accuracy of detection. To meet both of these requirements, the sensor element 7 or 11 should be arranged as close as possible to or in contact with the forward end wall of the casing 1. For example, if the sensor element 7 or 11 is in contact with the forward end wall of the casing 1, and the forward end wall of the casing 1 has a thickness of 0.2 mm, then even if the distance L1 is sufficiently large, e.g. 2.3 mm, the sensor element 7 or 11 is arranged sufficiently close to the rotary member B (i.e. spaced therefrom only by a distance of 2.5 mm). On the other hand, if the gap s (see FIG. 2) is 0.3 mm, and the distance between the sensor element 7 or 11 and the rotary member B is 2.5 mm, the distance L1 will be narrowed to 2.0 mm. Thus, the gap s has to be determined taking these factors into consideration too.

Figure 5:
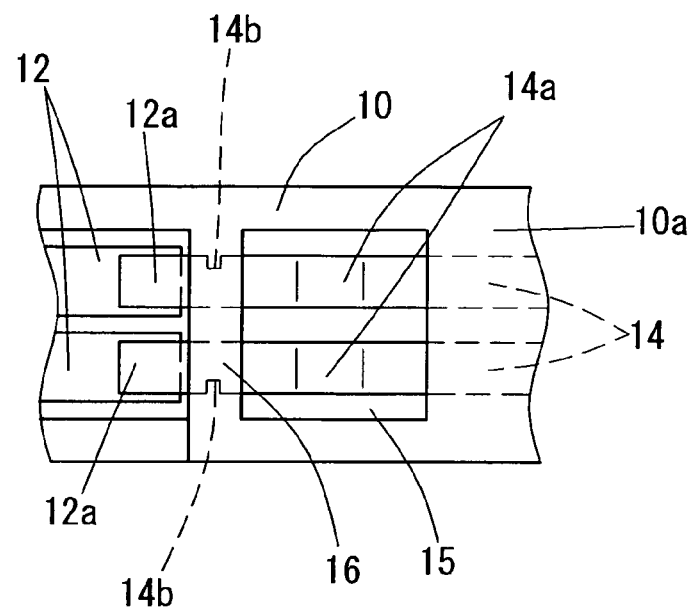
FIG. 5 is a partial plan view of the rotation sensor of FIG. 1, showing connecting portions of a pair of lead pieces that are connected to respective relay terminals.

The relay terminals 14 extend through a base portion 10a of the holder 10, a gap 16 and a support wall 16 integral with the holder 10. As shown in FIG. 5, the relay terminals 14 are formed with cutouts 14b at their portions disposed in the support wall 16. With this arrangement, when forming the support wall 16 by molding a resin, part of the resin will fill the cutouts 14b and hardens, thereby rigidly fixing the relay terminals 14 to the support wall 16.

Figure 10A:
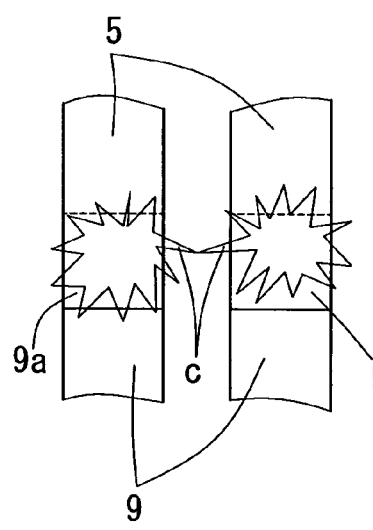
FIGS. 10A to 10C show examples of poor insulation between the connecting portions shown in FIGS. 9A and 9B.
Figure 10B:
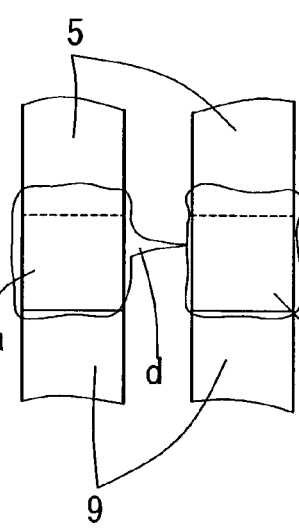
Figure 10C:
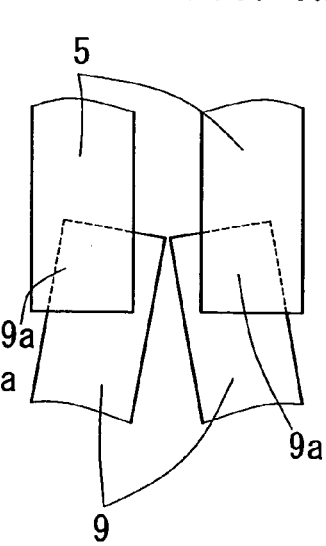

A lid 17 made of a synthetic resin is fitted in the opening 10e of the holder 10 to press the detector X against the holder 10, thereby holding the detector X in position in the holder 10. The lid 17 has a downwardly extending projection 18 adapted to be inserted between connecting portions 12a of the respective lead pieces 12 that are connected to the relay terminals 14, thereby separating, i.e. insulating the connecting portions 12a from each other. If the connecting portions 12a are directly connected to each other as shown in FIGS. 10A to 10C, the lid 17 cannot be snugly fit in the holder 10 because its projection 18 cannot be inserted between the connecting portions 12a. Thus, this fact is instantly detected by an operator.

With the detector X mounted on the holder 10 in the manner described above, the holder 10 is inserted into the cylindrical metallic casing 1 until its base portion 10a fits in the opening 1a of the casing 1. Then, an output cable 6 is connected to the ends of the relay terminals 14 protruding from the base portion 10a of the holder 10, a mounting fixture 20 is fitted on the casing 1, and the cover 4 is formed by molding a resin so as to enclose the opening 1a of the casing 1, the exposed portion of the holder 10, and the exposed portions of the relay terminals 14 and the output cable 6. The rotation sensor P is thus formed.

The cover 4 is formed by molding a resin with the casing 1 fixed in position. When forming the cover 4 by molding a resin, pressure is applied through a flange 1b of the casing 1 to the holder 10 as shown by chain lines in FIG. 2. The holder thus tends to bulge in the axial direction in the casing 1. The relay terminals 14 are thus pushed in the axial direction too. But since this pushing force is absorbed by the portions of the relay terminals 14 in the gap 15, and the relay terminals 14 are rigidly fixed to the support wall 16, no pushing force will act on the portions of the relay terminals 14 forwardly of the wall 16 and on the detector X.

The portions of the relay terminals 14 that are present in the gap 15 are preferably bent as shown at 14a in FIG. 2 to more effectively absorb any pushing force applied to the relay terminals 14 when forming the cover 4. But the bent portions 14b may not be formed. Even if the relay terminals 14 are straight, when pushing force is applied to the relay terminals 14, their portions in the gap 14 will deflect, thereby absorbing the pushing force, because the relay terminals 14 are rigidly fixed to the support plate 16. If the bent portions 14a are provided, their degree of bending should be determined taking into consideration the degree to which the pushing force is absorbed by the bent portions 14a.

Figure 6:
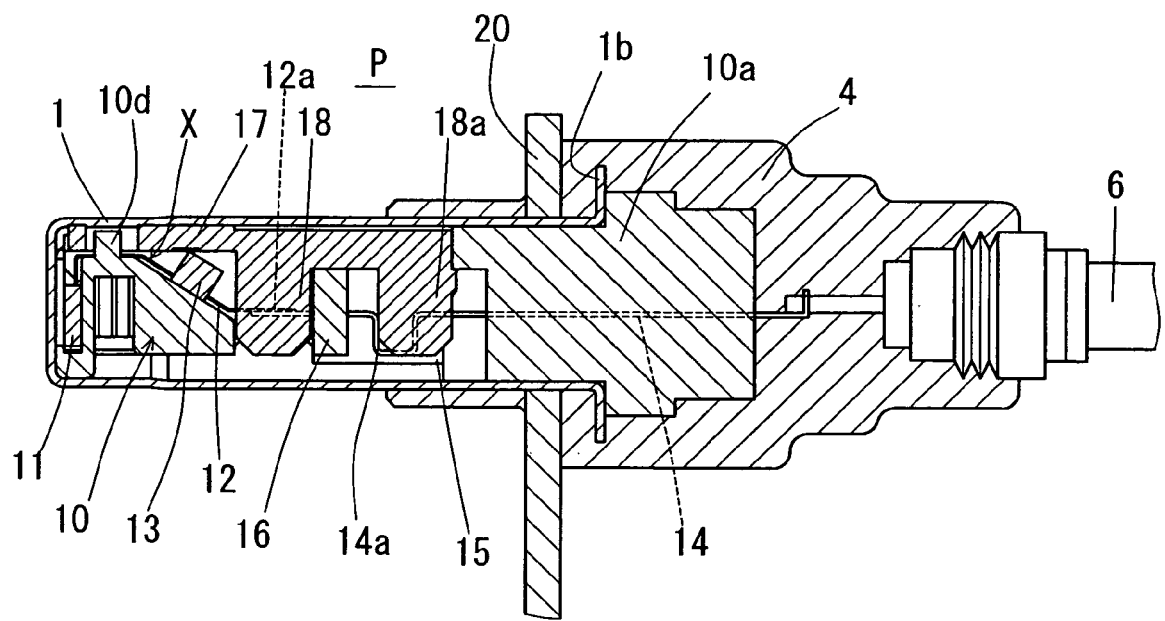
FIG. 6 is a front view in vertical section of a further embodiment.

The relay terminals 14 may be connected to the respective lead pieces 12 not by spot welding but by soldering or any other known means. In this case, too, the connecting portions 12a should be separated or insulated from each other by inserting the projection 18 therebetween. As shown in FIG. 6, the lid 17 may be provided with an additional projection 18a adapted to be inserted between the portions of the relay terminals 14 in the gap 14 to separate or insulate these portions from each other. If the projection 18a is provided, the projection 18 may be omitted.

While not shown, the lid 17 may be used in the conventional rotation sensor P shown in FIG. 8. In this arrangement, the lid 17 is fitted in an opening of the holder 2 in which the detector X mounted on the circuit board 3 is received so that its projection 18 is inserted between the connecting portions 9a of the pair of (flexible) lead wires 9 that are connected to the respective relay terminals 5 to separate or insulate the connecting portions 9a from each other. Instead of the lead wires 9, lead pieces as shown e.g. in FIG. 4 may be used.

In the embodiment, with the holder 10 received in the casing 1, the cover 4 is formed. But the casing 1 may be omitted. In this case, the entire holder 10 is embedded in a resin cover 4. The rotation sensor shown is a wheel speed sensor. But the rotation sensor according to the present invention may be a sensor for sensing the rotational speed of a different rotary member, or may be a different type of sensor such as an electromagnetic pickup type. The projection 18 may be a separate member from the lid 17.

According to the present invention, the lead pieces 12 extend from the sensor element 11 parallel to each other, and the electronic part 13 is mounted between the lead pieces 9. Thus, the detector X as well as the entire rotation sensor can be made small. The support wall 16 and/or the bent portions 14a of the relay terminals 14 may be omitted to further reduce the size of the rotation sensor.

What is claimed is:

1. A rotation sensor comprising a holder, a detector mounted to said holder for sensing any change in a magnetic field produced when a rotary member rotates and converting such change in the magnetic field to electrical signals, a pair of leads extending from said detector, a pair of relay terminals each having a connecting portion connected to one of said leads, wherein a surface of each leads and a surface of corresponding one of the relay terminals are directly connected together, an output line connected to said relay terminals, and an insulating member disposed between said connecting portions, and said detector is mounted in an opening formed in said holder, said rotation sensor further comprising a lid fitted in said opening, and wherein said insulating member is a projection formed on said lid and inserted between said connecting portions.

2. The rotation sensor of claim 1 wherein said holder is formed of a resin and retains said relay terminals, wherein said detector comprises a sensor element for sensing any change in a magnetic field, wherein said leads are lead pieces extending from said sensor element in parallel to each other.

* * * * *